(12) United States Patent
Horimoto et al.

(10) Patent No.: US 7,615,736 B2
(45) Date of Patent: Nov. 10, 2009

(54) OPTICAL SENSOR

(75) Inventors: Keiichi Horimoto, Sakura (JP); Akira Sakamoto, Sakura (JP); Yoshikiyo Noguchi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/129,018

(22) Filed: May 29, 2008

(65) Prior Publication Data

US 2009/0001258 A1    Jan. 1, 2009

(30) Foreign Application Priority Data

May 31, 2007  (JP)  ............................ 2007-145012
Aug. 27, 2007  (JP)  ............................ 2007-219672

(51) Int. Cl.
  *G01J 1/42*  (2006.01)
(52) U.S. Cl. ............................ 250/227.28; 250/227.29; 385/12
(58) Field of Classification Search ............ 250/227.11, 250/227.14, 227.19, 227.28, 227.29, 225; 385/9, 11, 12; 356/3.1, 73.1, 477
See application file for complete search history.

(56) References Cited

U.S. PATENT DOCUMENTS

| 4,249,076 | A | 2/1981 | Bergstrom et al. | |
|---|---|---|---|---|
| 4,996,418 | A | 2/1991 | Iwamoto et al. | |
| 5,068,527 | A | 11/1991 | Iwamoto et al. | |
| 7,465,916 | B2 * | 12/2008 | Horimoto et al. | ...... 250/227.11 |

FOREIGN PATENT DOCUMENTS

| JP | 57108605 A | 7/1982 |
|---|---|---|
| JP | 61145403 B2 | 7/1986 |
| JP | 61-275632 A | 12/1986 |
| JP | 63-169521 A | 7/1988 |
| JP | 02-049115 A | 2/1990 |
| JP | 02-057909 A | 2/1990 |
| JP | 03-243822 A | 10/1991 |
| JP | 6-8724 B2 | 2/1994 |
| JP | 09-005028 B2 | 1/1997 |
| JP | 11-352158 A | 12/1999 |
| JP | 3304696 B2 | 5/2002 |
| JP | 2003-214966 A | 7/2003 |
| JP | 2004-301769 A | 10/2004 |
| JP | 2005-049670 A | 2/2005 |

* cited by examiner

*Primary Examiner*—Kevin Pyo
(74) *Attorney, Agent, or Firm*—Sughrue Mion, PLLC

(57) ABSTRACT

An optical sensor includes a light source, a sensing unit, a first optical fiber transmitting light from the light source to the sensing unit, second and third optical fibers transmitting the light from a reflecting surface of the sensing unit to light-receiving portions, and a calculation unit calculating physical quantities from electrical signals from the light-receiving portions. End surfaces of these fibers opposed to the reflecting surface are fixed so that the longitudinal direction thereof and the normal line of the reflecting surface form an angle $\theta$, the second and third optical fibers are parallel to each other, and the fixing angles of the first optical fiber and the second and third optical fibers are symmetric about the normal line. These optical fibers have a single mode in the wavelength of which the optical fibers are used. A depolarizer is interposed between the light source and the first optical fiber.

8 Claims, 8 Drawing Sheets

OPTICAL SENSOR

BACKGROUND OF THE INVENTION

1. Field of the Invention

The present invention relates to an optical sensor (optical fiber sensor) detecting physical quantities such as pressure and temperature by measuring a variation in light intensity, and more particularly, to an optical sensor which can maintain high measurement precision even when a light transmission path is distorted, by suppressing polarization dependency with a low-cost and simple device configuration.

Priority is claimed on Japanese Patent Application No. 2007-145012, filed May 31, 2007, and Japanese Patent Application No. 2007-219672, filed Aug. 27, 2007, the content of which is incorporated herein by reference.

2. Description of Related Art

In the past, electrical sensors were widely used as a sensor measuring physical quantities such as displacement, temperature, and pressure of an object. However, since the electrical sensors require a supply of power and transmit measured signals (electrical signals) to remote locations through wires, the measurement precision thereof is deteriorated due to an influence of electromagnetic noises. On the contrary, since optical sensors using optical fiber convert measured signals into optical signals and transmit the optical signals to remote locations through optical fiber, it is possible to transmit the signals without suffering from electromagnetic noises and to measure the physical quantities with high precision due to its small measurement error (for example, see Japanese Unexamined Patent Publication Nos. H6-8724, S57-108605, H2-57909, H3-243822, and H2-49115, S63-169521, U.S. Pat. Nos. 5,068,527, 4,996,418, and 4249076, Japanese Unexamined Patent Publication Nos. H11-352158 and 2004-301769, Japanese Patent No. 3304696, and Japanese Unexamined Patent Publication Nos. 2003-214966, S61-275632, and 2005-49670).

As such physical-quantity optical sensors, sensors converting a variation in pressure into a variation in distortion using a distortion member (such as a bourdon tube) having a mechanism which is distorted by pressure and sensing the distortion by the use of a fiber Bragg grating (FBG) are known. Sensors are also known in which a reflecting plate (such as a diaphragm) displaced with pressure is opposed and fixed to an end surface of an optical fiber and the displacement is detected by measuring the light emitted from the end surface of the optical fiber by the use of the light reflected from the reflecting plate, whereby the pressure is detected from the displaced distance.

FIG. 1 is a diagram illustrating an example of a related optical pressure sensor. The optical pressure sensor includes a light source 1, a reflecting surface 4a of a reflecting plate 4, a sensing unit 3 of which the relative distance from an end surface of an optical fiber varies depending on a physical quantity such as pressure or temperature, a light-emitting first optical fiber 2 transmitting light from the light source 1 to the sensing unit 3, a light-receiving second optical fiber 5 and a light-receiving third optical fiber 6 transmitting the light reflected from the reflecting surface 4a of the sensing unit 3 to two light-receiving portions (first and second light-receiving portions 7 and 9), amplifiers 8 and 10 amplifying signals from the first and second light-receiving portions 7 and 9, and a calculation unit 11 calculating the physical quantity from a ratio of the amplified electrical signals from the first and second light-receiving portions 7 and 9. The end surfaces of the first to third optical fibers 2, 5, and 6 opposed to the reflecting surface 4a are fixed so that the longitudinal direction of the optical fibers and the normal line of the reflecting surface 4a form an angle θ. The second optical fiber 5 and the third optical fiber 6 are parallel to each other and the fixing angles of the first optical fiber 2 and the second and third optical fibers 5 and 6 are symmetrical about the normal line of the reflecting surface 4a.

FIG. 2 is an enlarged diagram of the sensing unit 3. The second optical fiber 5 and the third optical fiber 6 for receiving light are parallel to each other. The first optical fiber 2 and the second and third optical fibers 5 and 6 are fixed to be symmetrical about the normal line of the reflecting surface 4a by an angle θ. The light emitted from the first optical fiber 2 is reflected by the reflecting surface 4a and the reflected light coupled to the second optical fiber 5 and the third optical fiber 6 are transmitted to the first and second light-receiving portions 7 and 9, respectively, whereby the light intensities P1 and P2 are measured and the light intensity ratio F(P1,P2)= (P1−P2)/(P1+P2) is calculated by the calculation unit 11. Here, since the light intensity varies depending on the relative distance between the reflecting surface 4a and the end surface of the optical fibers, the light intensity ratio F(P1,P2) varies. Accordingly, by constructing the sensing unit 3 so that it is displaced depending on physical quantities such as pressure and temperature, it is possible to detect such physical quantities.

In the optical pressure sensor, the measuring instrument can be manufactured at a low cost and it is possible to easily process the measured signals. In order to measure the light intensity, factors other than displacement of the reflecting plate, for example, a variation in light intensity of the light source or a variation in light intensity due to a transmission loss, causes a measuring error, but it is possible to enhance the measurement precision by compensating for the light intensity ratio of the light received by plural optical fibers in addition to greatly reducing the variation in transmission loss.

In the situation described above in which the optical sensor became popular, the applicant of the invention suggested an optical sensor having high measurement precision, which is disclosed in Japanese Unexamined Patent Publication No. 2007-24826.

As shown in FIG. 3, the optical sensor includes a sensing unit 3 which has an object 16 having a reflecting surface 15 and of which the relative distance from the end surface of an optical fiber varies depending on physical quantities such as pressure and temperature, a first optical fiber 2 (light-transmitting optical fiber) transmitting light from a light source, second and third optical fibers 5 and 6 (light-receiving optical fibers) transmitting the light reflected by the reflecting surface 15 of the sensing unit 3 to light-receiving portions 18A and 18B, respectively, and a calculation unit 11 acquiring a ratio of electrical signals from the light-receiving portions 18A and 18B and calculating the physical quantities.

As shown in FIG. 2, in this optical sensor, light is emitted to the object 16 disposed at the relative distance D from the end surface of the first optical fiber 2, the reflected light is received by the second and third optical fibers 5 and 6, and the displaced distance of the object is calculated. The first optical fiber 2 is disposed so that the longitudinal direction thereof and the normal line of the reflecting surface of the object 16 form an angle θ, the second and third optical fibers 5 and 6 are disposed parallel to each other so that the longitudinal direction and the normal line form the angle θ. The first optical fiber 2 and the second and third optical fibers 5 and 6 are opposed to each other with the normal line interposed therebetween, and the first to third optical fibers 2, 5, and 6 have a single mode in the wavelength of which the fibers are used.

Hereinafter, the optical sensor having the above-mentioned configuration is called a 3-core array sensor.

Variation characteristics of the light intensity and the intensity ratio with the variation of the relative distance D will be now described with reference to FIG. 4. In the figure, the horizontal axis represents the relative distance D, the left vertical axis represents the light intensity, and the right vertical axis represents the intensity ratio. The characteristic graph illustrates variations of the reflected light intensities P1 and P2 of the second and third optical fibers and the intensity ratio F(P1,P2) with the variation of the relative distance D between the end surfaces of the first to third optical fibers and the reflecting surface. Hereinafter, the variation characteristic is called distance dependency. F(P1,P2)=(P1−P2)/(P1+P2) was used as an expression for calculating the intensity ratio F.

As can be seen from the distance dependency, the intensity ratio F(P1,P2) forms a curve having a substantially linear slope portion. The slope portion is used to measure the physical quantities. As the slope portion is closer to being linear, a correction function for converting the variation in distance into the physical quantity is simpler, whereby the calculation is facilitated and error is reduced. On the other hand, the measuring sensitivity is expressed as Δ=dF(P1,P2)/dD of the slope, where the measuring sensitivity increases as Δ increases.

FIG. 5 shows the distance dependency of the intensity ratio F measured using the 3-core array sensor having different angles (fixing angle of fibers) θ. As shown in the figure, when the fixing angles θ of the fibers increase, the peak position of P1 and P2 gets close to the reflecting surface and thus A increases. On the contrary, when the fixing angles θ of the fibers are reduced, the peak position gets apart from the reflecting surface and thus D decreases. That is, when the fixing angles θ of the fibers vary, D varies. Accordingly, it is possible to easily select the measuring sensitivity. Here, the measuring range, that is, the range of the relative distance where the linear slope portion exists in the distance dependency, has a trade-off relationship with the measuring sensitivity. Accordingly, when the measuring sensitivity increases, the measuring range narrows. On the contrary, when the measuring sensitivity decreases, the measuring range increases.

As described above, the relative distance D can be induced from the intensity ratio F. That is, even when a variation in light intensity of the light source or a variation in light intensity due to the bending loss of the first optical fiber occurs, the intensity ratio F does not vary, thereby calculating the relative distance D with high precision.

In the related optical sensor, since the reflected light is received by two fibers parallel to each other to acquire the ratio of the light intensities thereof, it was considered that the influence of a variation in the polarized state need not be considered. For example, in the above-mentioned document, when a light emitting diode (hereinafter, referred to as "LED") is used as the light source, the polarization degree of the light source was not described, it was considered that the polarization degree does not affect the measurement precision, and no influence was recognized.

However, the inventors of the invention verified the polarization degree of the light source and the measurement precision in detail. As a result, it was first confirmed that the measurement precision decreases even with the polarization degree of the LED light source conventionally expected and it was seen that the influence increases as the fixing angles of the optical fibers increase.

In the sensors in which the light-emitting optical fiber and the light-receiving optical fiber have different structures among the sensors disclosed in the above-mentioned documents, when the polarization state of the emitted light varies, the light intensity varies, thereby reducing the measurement precision. There has been suggested a structure in which a certain specific angle is given to the light-emitting optical fiber and the light-receiving optical fiber. However, when light is reflected while an angle is given, it is more easily affected by the variation in polarization state, thereby further reducing the measurement precision.

In the sensors using a difference in wavelength between plural LEDs among the sensors disclosed in the above-mentioned documents, since the number of components increases, the device configuration is complicated and the cost increases.

A simple optical sensor (optical fiber sensor) with low cost and high precision is not realized in which the polarization dependency is suppressed in a light source having a small polarization degree like an LED.

The present invention is contrived to solve the above-mentioned problems. An object of the present invention is to provide a simple optical sensor with low cost and high precision in which the polarization dependency is suppressed.

In the above-mentioned 3-core array sensor, when the variation difference in light intensity occurs due to the bending loss in the second and third optical fibers, the intensity ratio F also varies, whereby the precision of the calculated relative distance D is reduced.

The invention is contrived to solve the above-mentioned problem. Another object of the invention is to provide an optical sensor that can suppress a decrease in measurement precision due to the bending loss in a light transmitting path.

SUMMARY OF THE INVENTION

According to an aspect of the present invention, there is provided an optical sensor including: a light source; a sensing unit having a reflecting surface and having a relative distance from an end surface of an optical fiber varying depending on physical quantities such as pressure and temperature; a first optical fiber transmitting light from the light source to the sensing unit; second and third optical fibers transmitting the light reflected from the reflecting surface of the sensing unit to a plurality of light-receiving portions, respectively; and a calculation unit calculating the physical quantities from a ratio of electrical signals from the light-receiving portions. Here, end surfaces of the first to third optical fibers opposed to the reflecting surface are fixed so that the longitudinal direction of the optical fibers and the normal line of the reflecting surface form an angle θ, the second optical fiber and the third optical fiber are parallel to each other, and the fixing angles of the first optical fiber and the second and third optical fibers are symmetric about the normal line of the reflecting surface. The first to third optical fibers have a single mode in the wavelength of which the optical fibers are used. A depolarizer is interposed between the light source and the end surface of the first optical fiber.

In the optical sensor, it is preferable that an LED is used for the light source.

In the optical sensor, it is preferable that the depolarizer is a fiber depolarizer using a polarization-maintaining fiber.

In the optical sensor, it is preferable that the fiber depolarizer is formed by fusing and bonding two polarization-maintaining fibers L1 and L2 in a state where a birefringent major axis is offset by 45° by a stress applying portion and 0.1 m≦L1≦10 m is satisfied where the fiber length ratio L1:L2 of the polarization-maintaining fibers is 1:2.

In the optical sensor, it is preferable that the degree of polarization of the emitted light is 20% or less.

According to another aspect of the present invention, there is provided a optical sensor including: a light source; a light-transmitting optical fiber transmitting light from the light source to an object; two light-receiving optical fibers transmitting the light reflected from a reflecting surface of the object to two light-receiving portions; and a calculation unit calculating physical quantities based on a ratio of electrical signals from the light-receiving portions. Here, three optical fibers opposed to the reflecting surface are fixed so that the longitudinal direction of the optical fibers and the normal line of the reflecting surface form an angle θ, the light-receiving optical fibers are parallel to each other, the fixing angles of the light-transmitting optical fiber and the light-receiving optical fibers are symmetric about the normal line of the reflecting surface, and the optical fibers have a single mode in the wavelength of which the optical fibers are used. A taped portion in which the light-receiving fibers are coated in a bundle is provided.

In the above-mentioned optical sensor, it is preferable that a taped portion in which the light-transmitting optical fiber and the light-receiving optical fibers are coated in a bundle is provided and the light-receiving optical fibers in the taped portion are adjacent to each other.

In the above-mentioned optical sensor, it is preferable that a taped portion in which the light-transmitting optical fiber, the light-receiving optical fibers, and one or more dummy fibers are coated in a bundle is provided, the light-receiving optical fibers in the taped portion are fixed to be adjacent to each other, and the light-transmitting optical fiber or the one or more dummy optical fibers are disposed on both sides of the light-receiving optical fibers.

According to the invention, it is possible to realize a simple optical sensor with low cost and high precision by the use of a light intensity measuring method using a 3-core array permitting an easy measurement.

In addition, the LED light source and the depolarizer are combined. Accordingly, even when the fibers are fixed with an angle given thereto, it is possible to perform the measurement with high precision without any influence of the variation in polarization state.

By using a fiber depolarizer as the depolarizer, the coupling to transmission-path fibers is facilitated.

When the fiber length ratio L1:L2 of the polarization-maintaining fibers used for the fiber depolarizer is 1:2, it is possible to cope with the polarization so as to satisfy $1\,m \leq L1 \leq 10\,m$.

In the optical sensor according to the present invention, since the taped portion in which two light-receiving optical fibers are coated in a bundle is provided, it is possible to reduce the deterioration in measurement precision due to the bending loss in the light transmitting path, thereby providing an optical sensor with high measurement precision.

DETAILED DESCRIPTION OF THE INVENTION

Hereinafter, optical sensors according to exemplary embodiments of the invention will be described with reference to the accompanying drawings.

Figure 6:
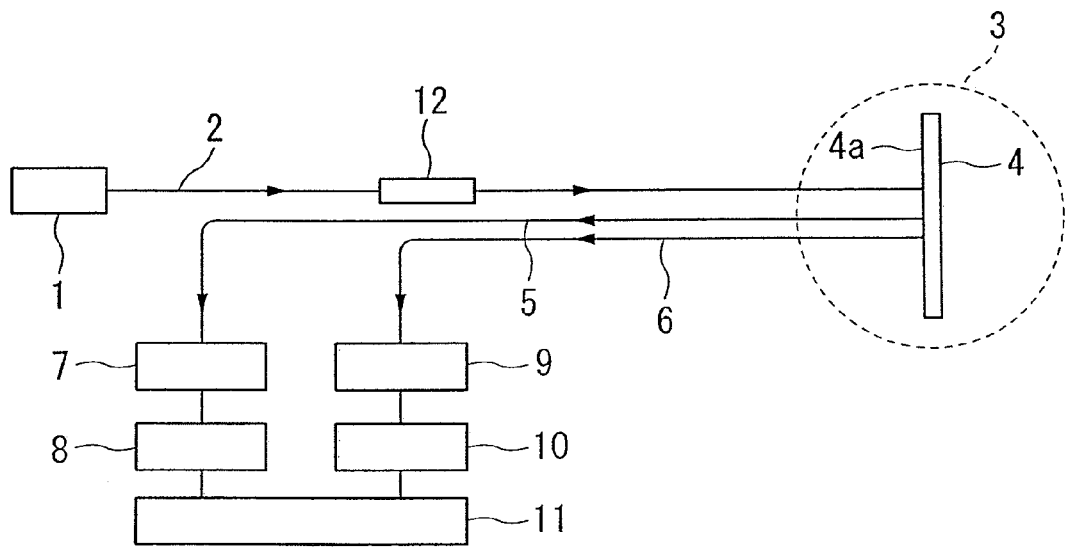
FIG. 6 is a diagram illustrating a configuration of an optical sensor according to an embodiment of the present invention.

FIG. 6 is a diagram illustrating a configuration of an optical sensor according to a first embodiment of the invention. The optical sensor according to this embodiment includes a light source 1, a sensing unit 3 having a reflecting surface 4a of a reflecting plate 4 and having a relative distance from an end surface of an optical fiber varying depending on physical quantities such as pressure and temperature, a first optical fiber 2 (light emitting port) transmitting light from the light source 1 to the sensing unit 3, a second optical fiber 5 and a third optical fiber 6 transmitting the light reflected from the reflecting surface 4a of the sensing unit 3 to first and second light-receiving portions 7 and 9, respectively, a calculation unit 11 calculating the physical quantities from a ratio of electrical signals from the first and second light-receiving portions 7 and 9 amplified by amplifiers 8 and 10, and a depolarizer 12 interposed between the light source 1 and the end surface of the first optical fiber 2.

Figure 1:
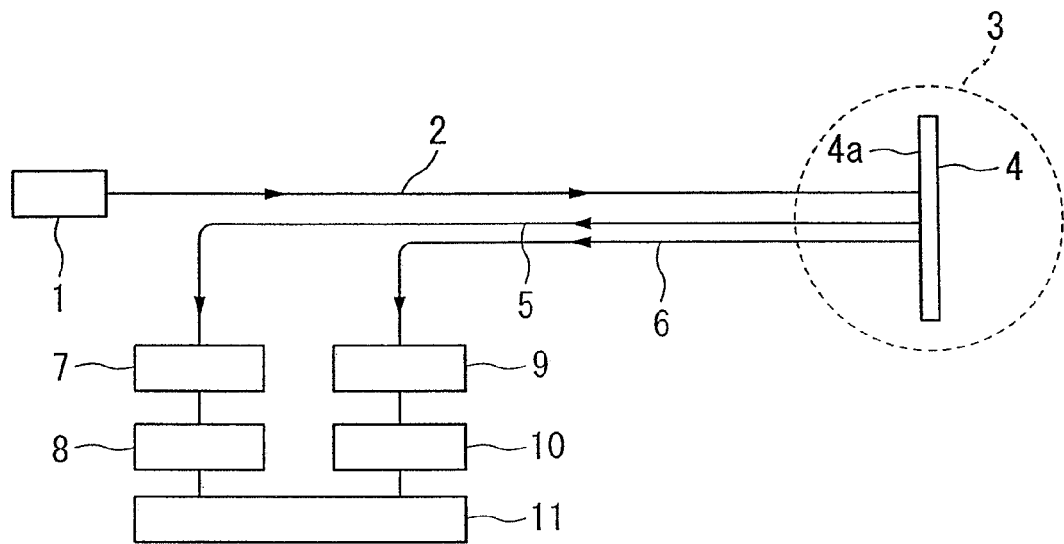
FIG. 1 is a diagram illustrating a configuration of a related optical sensor.
Figure 2:
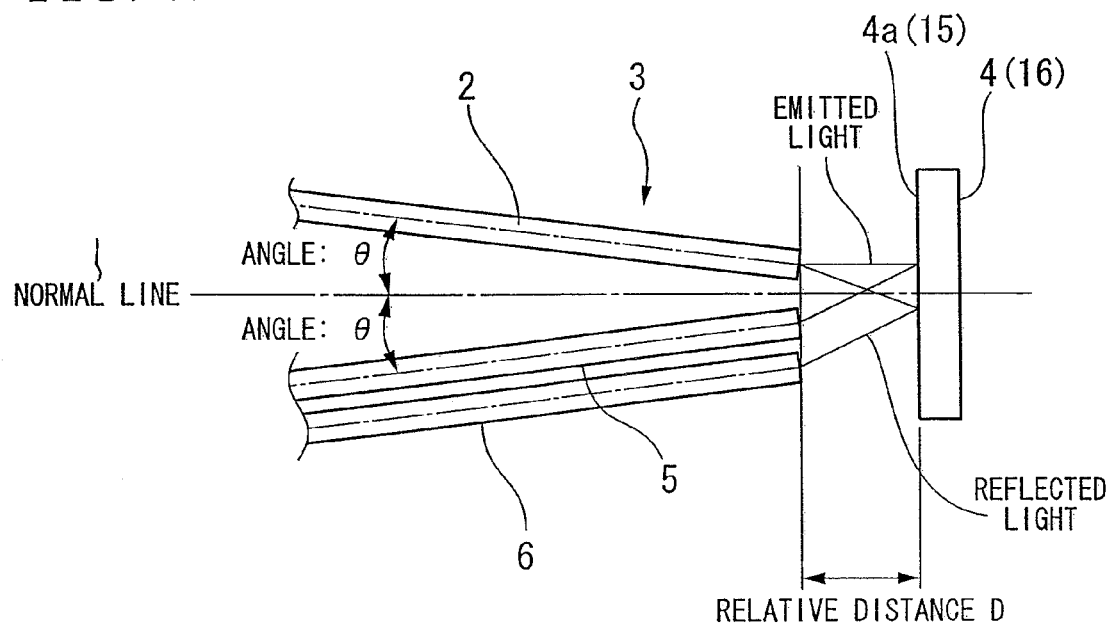
FIG. 2 is an enlarged view of a sensing unit of the optical sensor shown in FIG. 1.
Figure 3:
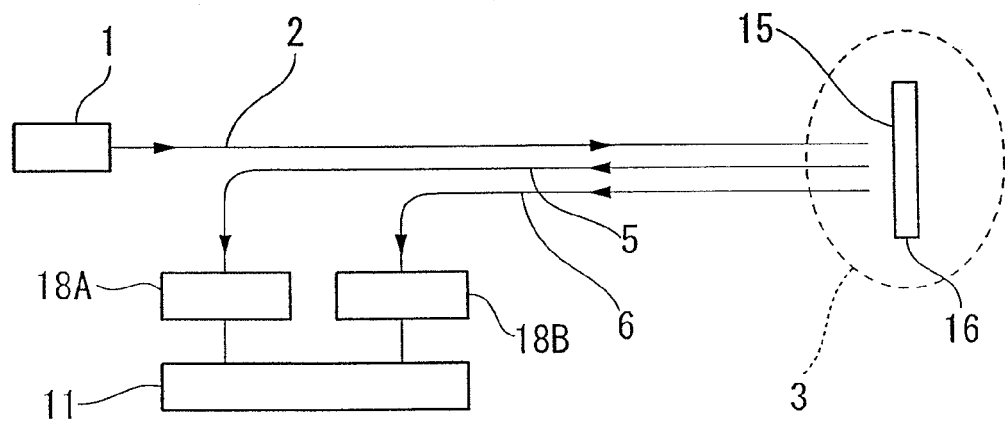
FIG. 3 is a diagram illustrating a configuration of a related 3-core array sensor.
Figure 4:
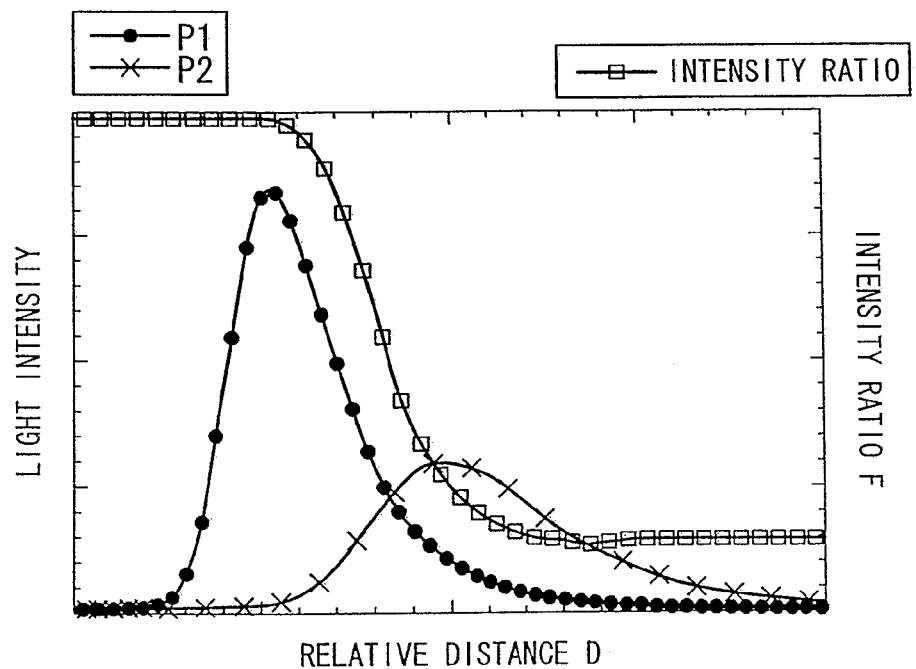
FIG. 4 is a graph illustrating relationships among a relative distance D, a light intensity, and an intensity ratio F in the 3-core array sensor.
Figure 5:
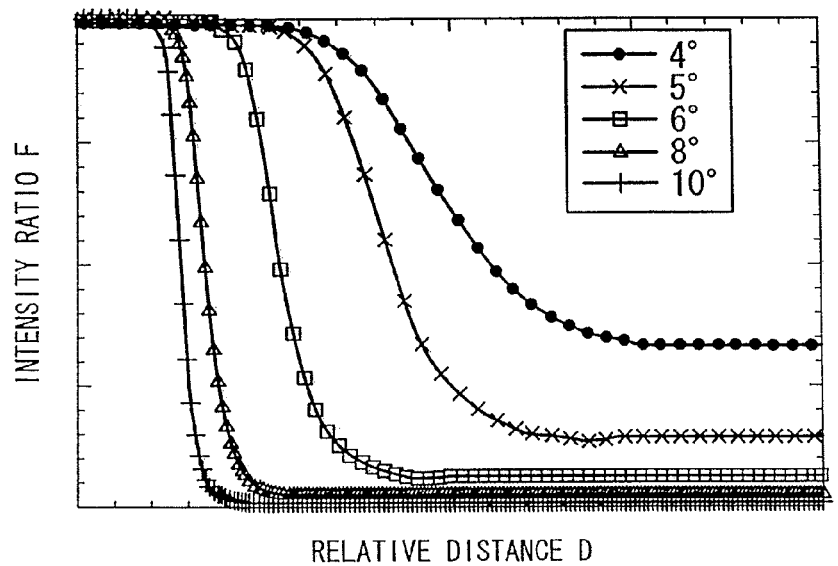
FIG. 5 is a graph illustrating angle dependency of the relative distance D and the intensity ratio F in the 3-core array sensor.

In the sensing unit 3, as shown in FIG. 2, end surfaces of the first to third optical fibers 2, 5, and 6 opposed to the reflecting surface 4a are fixed so that the longitudinal direction of the optical fibers and the normal line of the reflecting surface form an angle θ, the second optical fiber 5 and the third optical fiber 6 are parallel to each other, and the fixing angles of the first optical fiber 2 and the second and third optical fibers 5 and 6 are symmetric about the normal line of the reflecting surface 4a. The first to third optical fibers 2, 5, and 6 have a single mode in the wavelength of which the fibers are used.

By employing the above-mentioned configuration according to this embodiment, it is possible to realize a simple optical sensor with low cost and high precision by the use of a light intensity measuring method using a 3-core array permitting an easy measurement. In the sensor using the light intensity measuring method, when angles of fibers about the reflecting surface 4a are not given, an influence of the variation in the polarization state is small. Accordingly, the target precision can be accomplished by employing an LED having a small degree of polarization as the light source 1. However, when the fibers are fixed with given angles, the inventors confirmed that the measurement precision is reduced only due to a variation in polarization state of the LED having a small degree of polarization degree and the influence thereof is proportional to the magnitude of the fixing angle.

As disclosed in Japanese Unexamined Patent Publication Nos. H11-352158 and 2004-301769, a sensor suppressing the above-mentioned influence by inserting a depolarizer is known as a sensor using a method other than the light intensity measuring method. However, when a laser diode (hereinafter, referred to as "LD") is used, the line width of the spectrum is about 1 nm and thus it is difficult to effectively depolarize the light. Accordingly, it is not practical. In a super-luminescent diode (hereinafter, referred to as "SLD"), since the spectrum line width is greater than that of the LD and the half-value width is 10 nm or more, the depolarization is relatively easy and the degree of polarization can be regarded so as to be equal or less than a proper value. In this way, as the half-value width of the spectrum of the light source increases, the depolarization effect increases. It is preferable that the half-value width is about 1 nm or more. However, since the light source is more expensive than the LED, it is preferable that the LED light source be used to provide a low-cost sensor.

Therefore, the inventors invented an optical sensor having a 3-core array configuration in which an LED having a small degree of polarization and a low price and a depolarizer are combined. As a result, even with a configuration in which fibers are fixed with given angles, an optical sensor with high precision which can suppress the decrease in measurement precision due to a variation in polarization state and which does not depend on the magnitude of the fixing angle of the fibers was realized.

The depolarizer 12 is a device depolarizing light by polarizing the emitted light of the light source 1 into many random polarized beams. In this embodiment, a polarization-maintaining fiber depolarizer employing polarization-maintaining fibers is used. The polarization-maintaining fiber depolarizer is formed by fusing and bonding fibers having a ratio L1:L2 of fiber lengths of 1:2 in a state where birefringent major axis is offset about 45° by the use of a stress applying portion. By inserting the depolarizer, the polarization state of the light source is forcibly depolarized, thereby suppressing the influence of the variation in polarization state. The polarization-maintaining fiber depolarizer is used in a state where the side thereof having a fiber length L1 is usually connected to the light source. The depolarizer 12 is not limited to the polarization-maintaining fiber, but may employ a crystal plate having optical anisotropy.

In general, the degree of polarization of the emitted light of the LED light source is considered to be smaller than that of the LD or the SLD, but has a deviation in the range of 5 to 50% due to a manufacturing difference. Accordingly, when the LED light source is used for the optical sensor, the polarization state may vary by 50% in the degree of polarization in maximum, thereby deteriorating the measurement precision. Here, it may be considered that the degree of polarization of the light source is not made to decrease, but the variation in polarization state is suppressed. However, when it is intended to maintain the polarization state of the entire transmission path, high-cost specific fibers such as polarization-maintaining fibers are required, which is not desirable. The optimum lengths of the fiber lengths L1 and L2 at the time of manufacturing the depolarizer 12 are different depending on the light source, but when the LED of a 1,300 nm band is used and the ratio of the fiber lengths L1 and L2 is 1:2, it is preferable that L1 is 0.1 m or more. Since the polarization-maintaining fibers are very expensive, it is preferable that L1 is 10 m or less.

Because of the influence on the measurement precision with the variation in polarization state, for example, when an LED light source having a degree of polarization of 40% is used and the polarization state varies with a fixing angle θ=6° of the fibers, the possible measurement precision is about ±0.4% F.S. However, when the depolarizer 12 is inserted, the degree of polarization of the emitted light is 5% or less and thus the measurement precision is improved up to ±0.05% F.S. When the degree of polarization of the emitted light from the light source varies in the range of 0% to 50%, the influence on the measurement precision is proportional. When the fibers are not fixed with a given angle, that is, when θ=0°, the measurement precision is about ±0.2% F.S. in maximum with the degree of polarization of 50%. However, when the fibers are fixed with a given angle of θ=6°, the measurement precision is about ±0.6% F.S in maximum and is reduced up to +1% F.S. in maximum when θ=10°. As the fixing angles θ of the light-emitting fiber and the light-receiving fiber increases, the variation in polarization state further affects the measurement precision. Accordingly, when the fibers are fixed with a given angle by the use of the LED light source, it is difficult to accomplish the measurement precision of ±0.2% F.S. or less and thus it is necessary to use the depolarizer 12. The degree of polarization of the emitted light required for accomplishing the measurement precision of ±0.25% F.S. is 18% or less when the fixing angle is θ=6° and the degree of polarization is 12% or less when the fixing angle is θ=10°.

EXAMPLE 1

The deviation of the degree of polarization of an LED light source usually available in the market was checked. The deviation was measured by the use of a light polarization analyzer (made by Agilent, HP8509) in a state where rated voltage and current are applied to 10 LED light sources of a 1,310 nm band. The measurement result is shown in Table 1.

TABLE 1

| Sample No. | Polarization degree (%) |
| --- | --- |
| 1 | 5.8 |
| 2 | 36.7 |
| 3 | 6.1 |
| 4 | 37.2 |
| 5 | 8.6 |
| 6 | 16.9 |
| 7 | 17.2 |
| 8 | 48.4 |
| 9 | 27.1 |
| 10 | 9.8 |

It could be seen from the result of Table 1 that the degree of polarization of the LED light source has a deviation in the range of 5% to 50%.

EXAMPLE 2

Figure 7:
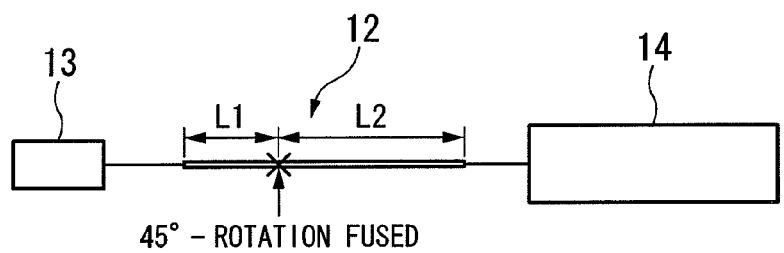
FIG. 7 is a diagram illustrating a configuration of a tester for a depolarizer according to example 2.

The suppression effect of the degree of polarization on the fiber length of the depolarizer 12 was checked. Plural sets of polarization-maintaining fibers having a ratio of the fiber lengths L1 and L2 of 1:2 were prepared and depolarizers 12 were manufactured by fusing and bonding the polarization-maintaining fibers so that the stress applying portions have an angle of about 45°. A measuring meter is shown in FIG. 7. By using an LED 13 with a degree of polarization of 50%, the fiber length L1 side of the depolarizer 12 was connected to the emission side of the LED 13 and the degree of polarization of the emitted light from the fiber length L2 side was measured by the use of the light polarization analyzer 14.

Figure 8:
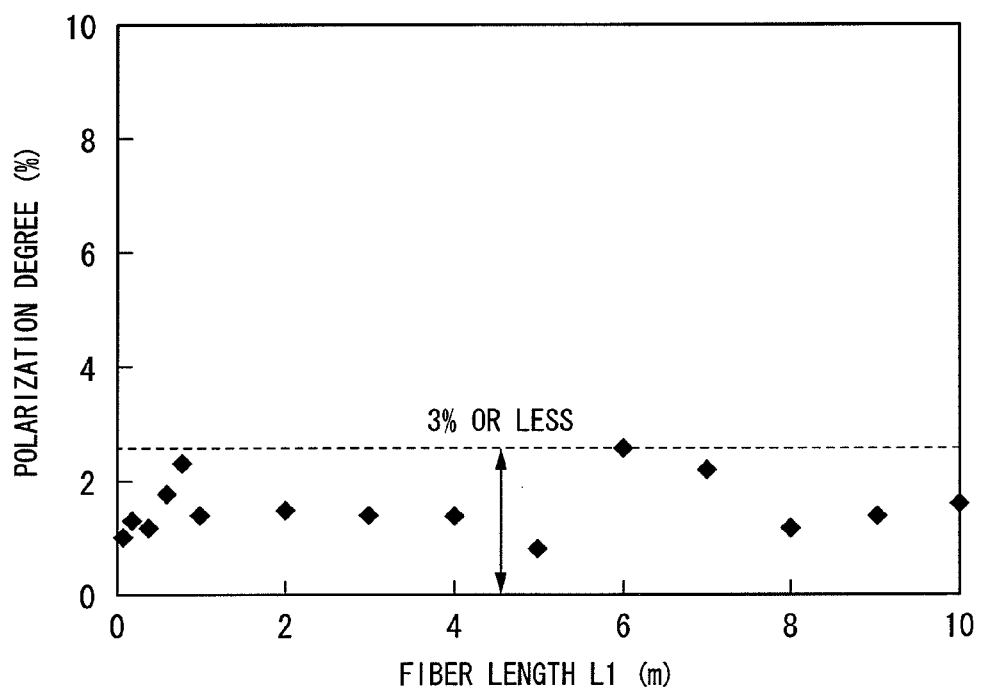
FIG. 8 is a graph illustrating a relationship between a fiber length L1 of the depolarizer and a degree of polarization as the test result according to Example 2.

The measurement result is shown in FIG. 8. In FIG. 8, the horizontal axis represents the fiber length L1 and the vertical axis represents the degree of polarization measured by the use of the light polarization analyzer. When the fiber lengths are adjusted in the range of L1=0.1 m and L2=0.2 m to L1=10 m and L2=20 m, the degree of polarization of the emitted light was suppressed to 3% or less. When the fiber length L1 was 0.1 m or more, it was confirmed that the effect of the depolarizer 12 was sufficiently obtained.

EXAMPLE 3

Figure 9:
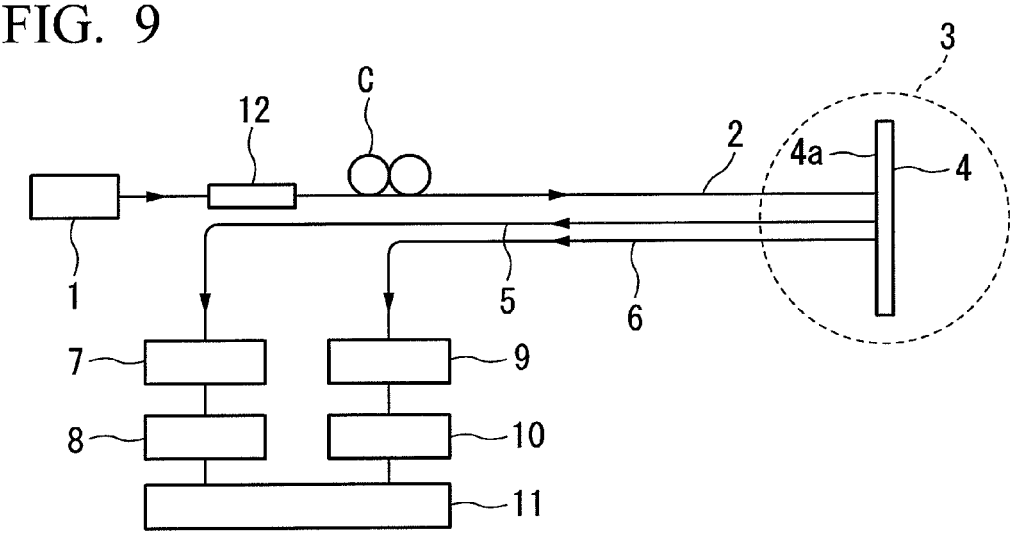
FIG. 9 is a diagram illustrating a tester used in a comparison test according to Example 3.

In the 3-core array structure of the optical sensor according to the embodiment of the present invention, it was compared with the measurement precision when the depolarizer is not inserted, by using a light source having a degree of polarization of about 40%. The measuring configuration is shown in FIG. 9. By inserting a polarization controller C into the emission side of the LED source 1, the polarization state in the first optical fiber 2 was made to vary. The relative distance between the reflecting surface 4a and the end surface of the optical fiber was set constant and the fiber lengths of the depolarizer 12 were set to L1=0.7 m and L2=1.4 m. The emitted light from the first optical fiber 2 was received by the second optical fiber 5 and the third optical fiber 6, the light intensities P1 and P2 were measured, and the light intensity ratio $F(P1,P2)=(P1-P2)/(P1+P2)$ was calculated, thereby calculating the measurement precision. Here, the measurement precision is obtained by dividing a difference from a mean value of the light intensity ratios $F(P1,P2)$ for the entire measuring time by the maximum value (full span: F.S.) by which the light intensity ratio $F(P1,P2)$ varies in the measurable range.

Figure 10A:
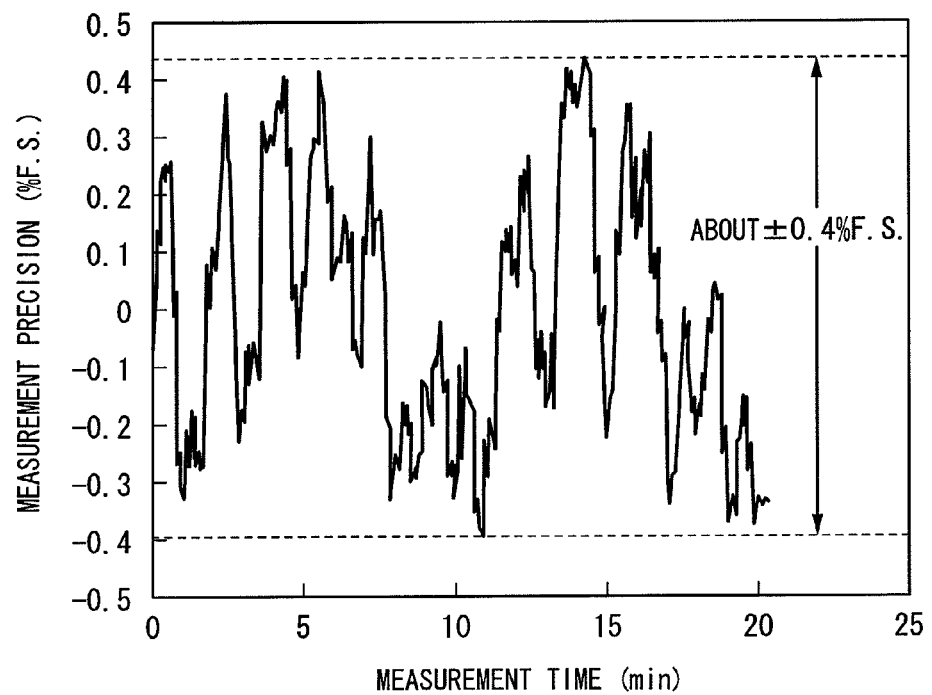
FIG. 10A is a graph illustrating a relationship between measurement precision and a measuring time when the depolarizer is not used as the test result of Example 3.
Figure 10B:
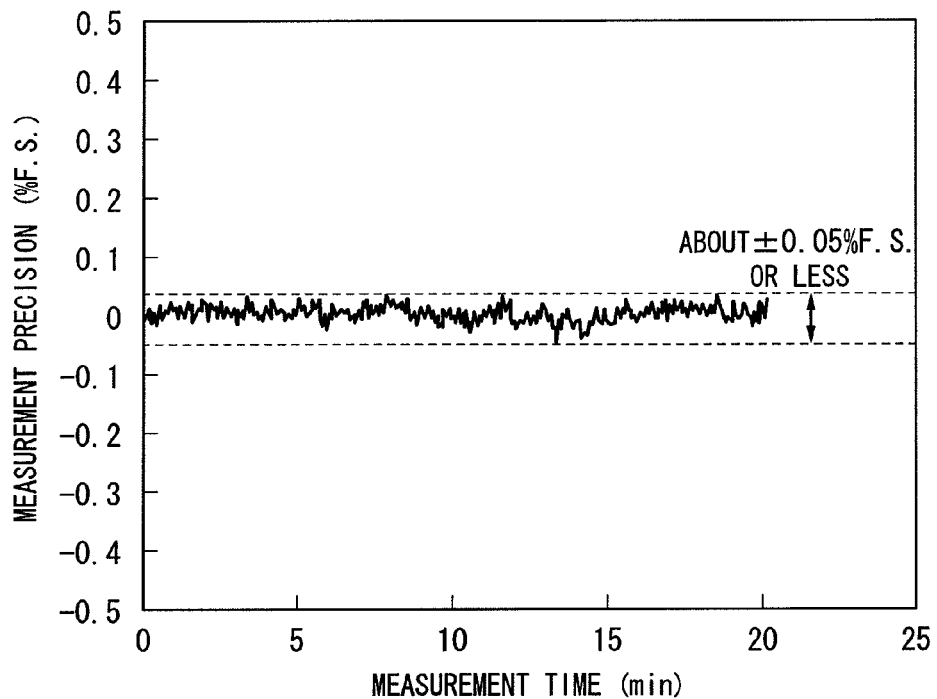
FIG. 10B is a graph illustrating a relationship between measurement precision and a measuring time when the depolarizer is used as the test result of Example 3.

The measurement result is shown in FIGS. 10A and 10B. In the figures, the horizontal axis represents the measuring time and the vertical axis represents the measurement precision. As shown in FIG. 10A, when the depolarizer 12 is not inserted, the measurement precision was about ±0.4% F.S. As shown in FIG. 10B, when the depolarizer 12 was inserted, it was seen that the measurement precision is improved to ±0.05% F.S.

EXAMPLE 4

The relationship between the degree of polarization and the measurement precision was checked by calculating the measurement precision using the LED light sources having various degrees of polarization. The measuring meter was the same as shown in FIG. 9. The degree of polarization of the light from the LED light sources was varied in the range of 1% to 50%, and the measurement precision was measured in the respective degrees of polarization.

Figure 11:
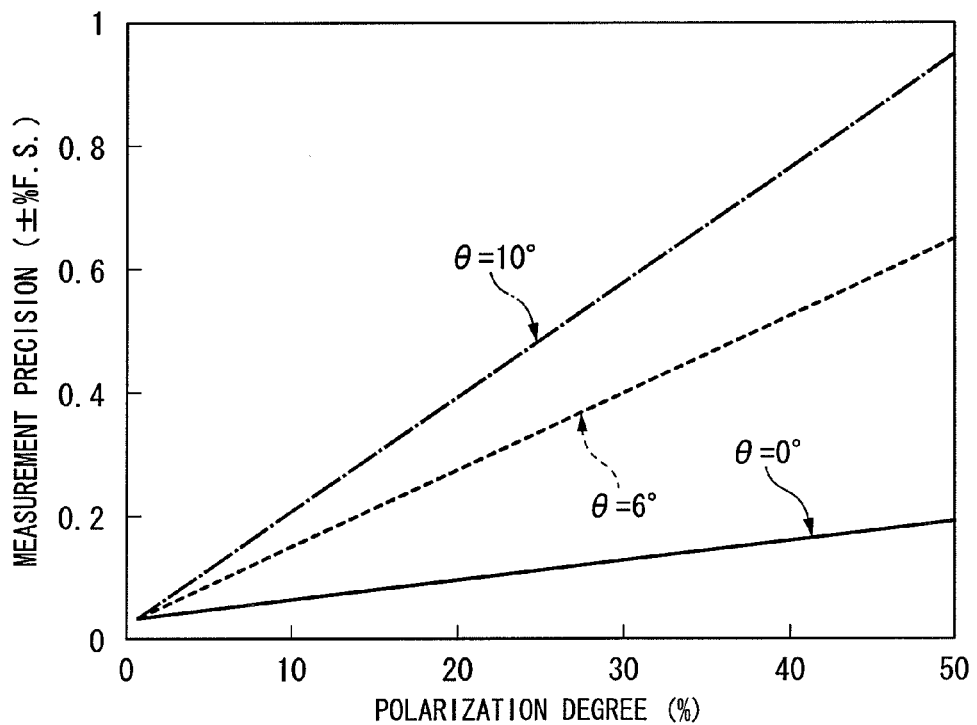
FIG. 11 is a graph illustrating a relationship between the degree of polarization and the measurement precision as the result of Example 4.

The measurement result is shown in FIG. 11. In FIG. 11, the horizontal axis represents the degree of polarization and the vertical axis represents the measurement precision. The case where the fixing angle of the 3-core array is $\theta=6°$ is indicated by a dashed line and the case where the fixing angle is $\theta=10°$ is indicated by a dot and dash line. The degree of polarization and the measurement precision are proportional to each other. That is, as the fixing angle of the optical fiber increases, the degree of polarization further affects the measurement precision. In order to accomplish the target measurement precision of ±0.25% F.S., it was confirmed that a degree of polarization of 18% or less was required for the fixing angle of $\theta=6°$ and a degree of polarization of 12% required for the fixing angle of $\theta=10°$.

Another embodiment of the invention will be described now.

Figure 12:
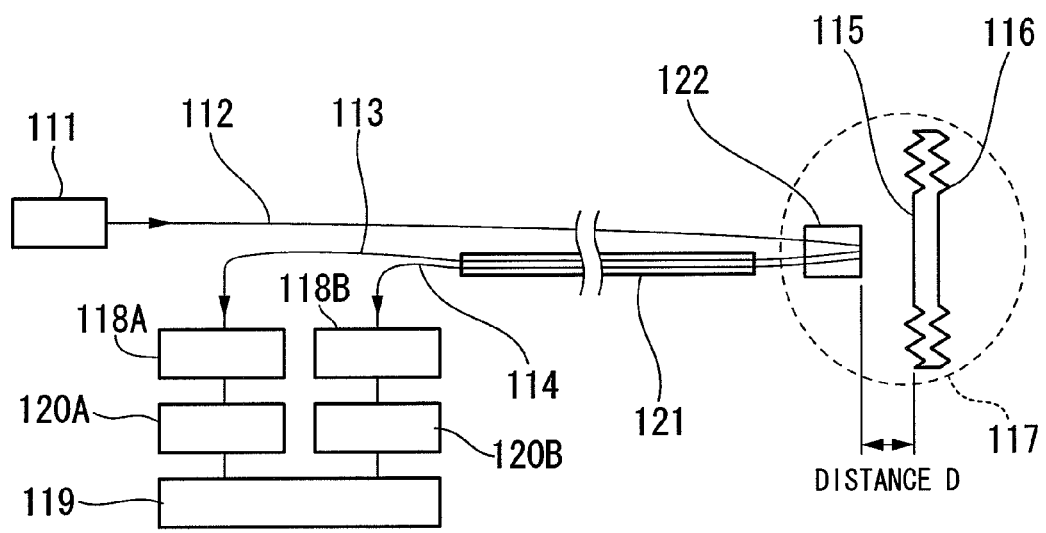
FIG. 12 is a diagram illustrating an optical sensor according to another aspect of the invention.

FIG. 12 is a diagram illustrating an optical sensor according to a second embodiment of the present invention. The optical sensor according to this embodiment includes a light source (LED) 111, a light-transmitting first optical fiber 112 transmitting light from the light source 111 to a diaphragm 116 as a measuring object, light-receiving second and third optical fibers 113 and 114 transmitting the light reflected from a reflecting surface 115 of the diaphragm 116 to two light-receiving portions 118A and 118B, and a calculation unit 119 calculating physical quantities based on a ratio of electrical signals from amplifiers 120A and 120B of the light-receiving portions 118A and 118B. Three optical fibers 112, 113, and 114 opposed to the reflecting surface 115 are fixed so that the longitudinal direction of the optical fibers and the normal line of the reflecting surface form an angle $\theta$, the light-receiving second and third optical fibers 113 and 114 are parallel to each other, the fixing angles of the light-transmitting first optical fiber 112 and the light-receiving second and third optical fibers 113 and 114 are symmetric about the normal line of the reflecting surface, and the first to third optical fibers 112 to 114 have a single mode in the wavelength of which the optical fibers are used. In the optical sensor according to this embodiment, a 2-core taped portion 121 in which the light-receiving second and third optical fibers 113 and 114 are coated in a bundle is provided.

In the optical sensor according to this embodiment, the diaphragm 116 is displaced depending on the pressure of a detection unit 117 and the relative distance D between the reflecting surface 115 and the optical fibers 112 to 114 varies with the pressure. The light source 111 employs a light emitting diode (LED) emitting light at a wavelength of a 1.3 μm band. The light-receiving portions 118A and 118B employ a photo diode (PD) receiving the reflected light transmitted through the light-receiving second and third optical fibers 113 and 114 and photo-electrically converting the received light. The electrical signals converted by the light-receiving portions 118A and 118B are amplified by the amplifiers 120A and 120B and are then input to the calculation unit 119, and the intensity ratio F of the signals is calculated by the calculation unit, thereby calculating the relative distance D between the end surfaces of the optical fibers 113 and 114 and the diaphragm 116. The angle $\theta$ formed by the longitudinal direction of the optical fibers and the normal line of the reflecting surface is set to 6° and a 3-core fiber array 122 fixed onto a quartz substrate having been subjected to V-groove processing is formed at the ends of the optical fibers 112 to 113. All the optical fibers 112 to 114 are a single-mode optical fiber commonly used for communication.

A 2-core taped portion 121 in which the fibers are coated in a bundle is formed in the light-receiving second and third optical fibers 113 and 114. Here, the term "taped" means that plural optical fibers are fixed with a UV resin in a tape shape so as to be adjoined with each other in the same plane.

Figure 13:
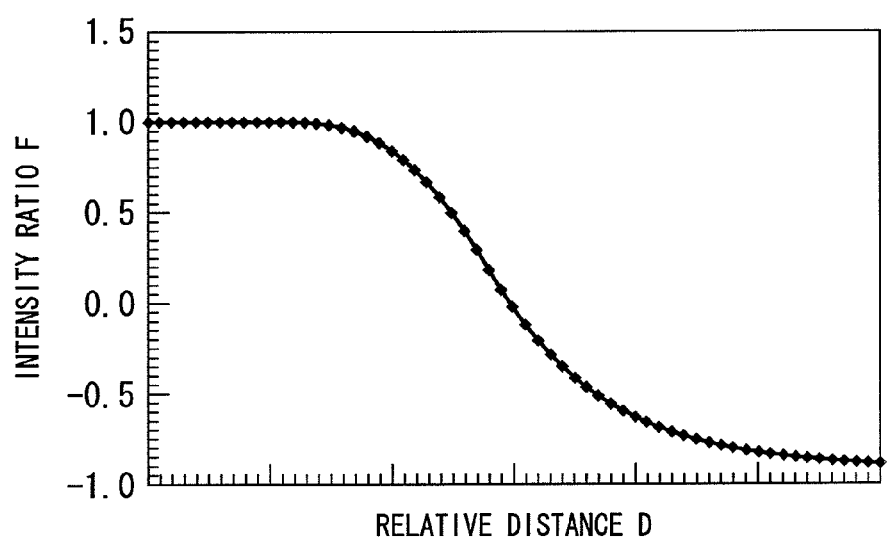
FIG. 13 is a graph illustrating the measurement result of distance dependency in the optical sensor shown in FIG. 12.

Here, the effect obtained by taping the light-receiving second and third optical fibers 113 and 114 will be described. As described above, in the optical sensor, the relative distance D can be calculated by calculating the intensity ratio $F(P1,P2)$ and an expression for calculating the intensity ratio F is $F(P1,P2)=(P1-P2)/(P1+P2)$. In practice, when the distance dependency is measured using the optical sensor shown in FIG. 12, the characteristic shown in FIG. 13 is obtained and the usable range of the intensity ratio F for facilitating the calculation using the substantially linear slope portion is 0.8.

When it is assumed that the measuring full span is 0.8 and the bending loss of 0.05 dB is generated only in the second optical fiber 113, a measuring error of about 0.7% of the full span occurs in the intensity ratio F. In general, since the measurement precision required for a water gauge used in the water supply and drainage is about ±0.3% F.S., the error of 0.7% is not allowable. In a single-mode optical fiber with a mode field diameter of 9.2 µm, the bending loss of 0.05 dB/m is generated when the bending diameter is 35 mm.

The loss occurring in the fibers when the 2-core taped fiber is bent will be considered below. In this case, when the taped fiber is bent in the same plate as two optical fibers, the difference in bending diameter between the fibers is at a maximum and the difference in bending loss occurring in the fibers is at a maximum. Since the difference in bending radius is as great as the outer diameter of the optical fiber of about 250 µm, the difference in bending loss when the bending diameter of about 35 mm occurs is 0.005 dB or less and the measuring error is 0.1% or less. That is, by making two light-receiving optical fibers into a chip, it is possible to suppress the deterioration in measurement precision due to the bending loss in the light transmitting path.

Figure 14:
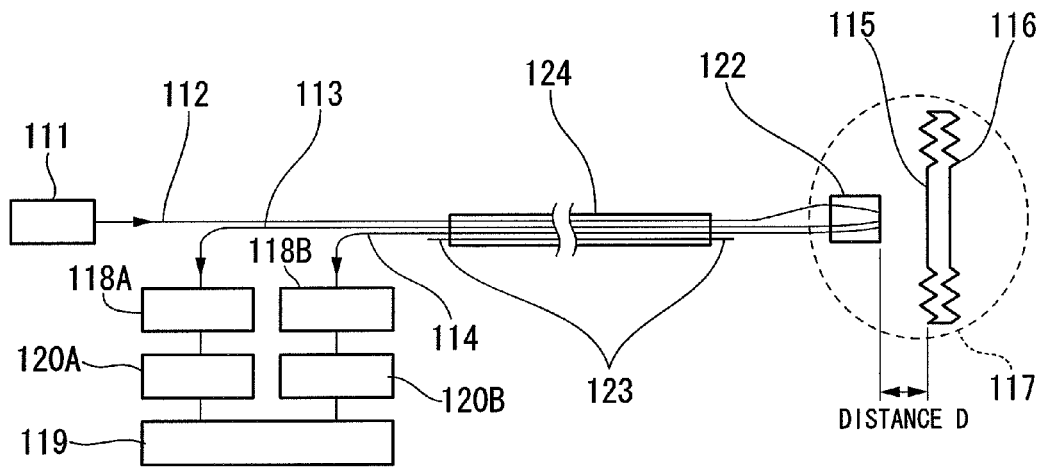
FIG. 14 is a diagram illustrating an optical sensor according to another aspect of the invention.

FIG. 14 is a diagram illustrating a configuration of an optical sensor according to another embodiment of the present invention.

The optical sensor according to this embodiment includes almost the same elements as the optical sensor according to the second embodiment shown in FIG. 12 and the same elements are denoted by the same reference numerals.

In this embodiment, a 4-core taped portion 124 in which a light-transmitting first optical fiber 112, light-receiving second and third optical fibers 113 and 114, and one or more dummy optical fibers 123 are coated in a bundle is provided. In the 4-core taped portion 124, the second optical fiber 113 and the third optical fiber 114 are adjacent to each other, the other side of the second optical fiber 113 is adjacent to the first optical fiber 112, and the other side of the third optical fiber 114 is adjacent to the dummy optical fiber 123.

A 4-core taped optical fiber commonly used for communication can be used as the 4-core taped portion 124. In this case, since the taping process can be omitted, it is possible to reduce the cost.

Here, the dummy optical fiber 123 is not used to transmit light, but to improve the mechanical strength of the taped fiber.

Figure 15:
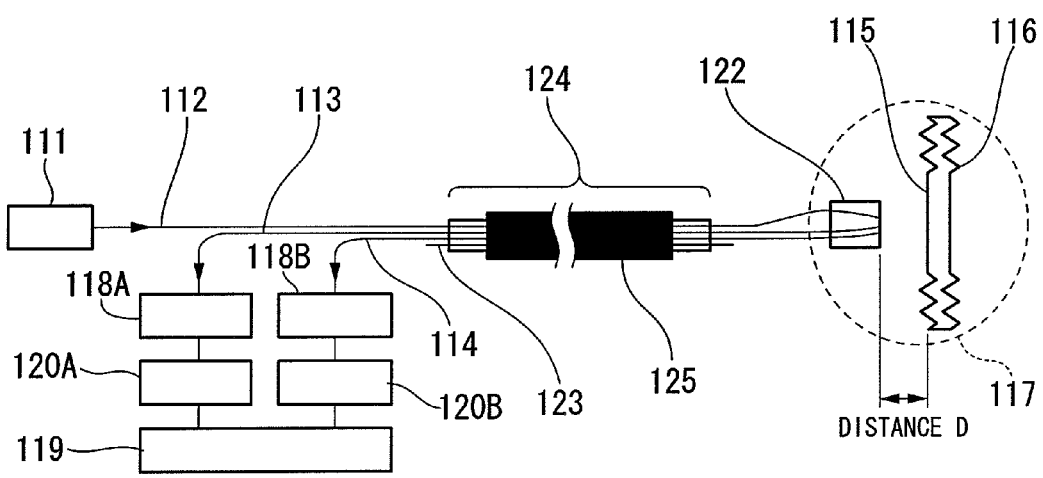
FIG. 15 is a diagram illustrating an optical sensor according to another aspect of the invention.

FIG. 15 is a diagram illustrating a configuration of an optical sensor according to another embodiment of the present invention. The optical sensor according to this embodiment includes almost the same elements as the optical sensor according to the embodiments shown in FIGS. 12 and 14 and the same elements are denoted by the same reference numerals.

In this embodiment, the 4-core taped portion 124 further includes an optical fiber cable 125. The optical fiber cable 125 usable here is a drop cable or a table-slot optical fiber cable commonly used for communication, it is available at low cost. When it is used outdoors, the optical fiber cable 125 according to this embodiment can be preferably used to protect the optical fibers.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical sensor comprising:
   a light source;
   a sensing unit having a reflecting surface and having a relative distance from an end surface of an optical fiber varying depending on physical quantities such as pressure and temperature;
   a first optical fiber transmitting light from the light source to the sensing unit;
   second and third optical fibers transmitting the light reflected from the reflecting surface of the sensing unit to a plurality of light-receiving portions, respectively; and
   a calculation unit calculating the physical quantities from a ratio of electrical signals from the light-receiving portions,
   wherein, end surfaces of the first to third optical fibers opposed to the reflecting surface are fixed so that the longitudinal direction of the optical fibers and the normal line of the reflecting surface form an angle θ,
   the second optical fiber and the third optical fiber are parallel to each other,
   the fixing angles of the first optical fiber and the second and third optical fibers are symmetric about the normal line of the reflecting surface,
   the first to third optical fibers have a single mode in the wavelength of which the optical fibers are used, and
   a depolarizer is interposed between the light source and the end surface of the first optical fiber.

2. The optical sensor according to claim 1, wherein a light emitting diode is used for the light source.

3. The optical sensor according to claim 1 or 2, wherein the depolarizer is a fiber depolarizer using a polarization-maintaining fiber.

4. The optical sensor according to claim 3, wherein the fiber depolarizer is formed by fusing and bonding two polarization-maintaining fibers L1 and L2 in a state where a birefringent major axis is offset by 45° by a stress applying portion and $0.1 \text{ m} \leq L1 \leq 10 \text{ m}$ is satisfied where the fiber length ratio L1:L2 of the polarization-maintaining fibers is 1:2.

5. The optical sensor according to claim 1, wherein the degree of polarization of the emitted light is 20% or less.

6. The optical sensor according to claim 2, wherein the degree of polarization of the emitted light is 20% or less.

7. The optical sensor according to claim 3, wherein the degree of polarization of the emitted light is 20% or less.

8. The optical sensor according to claim 4, wherein the degree of polarization of the emitted light is 20% or less.

* * * * *